United States Patent
Marupaduga et al.

(10) Patent No.: US 12,395,889 B2
(45) Date of Patent: Aug. 19, 2025

(54) NETWORK SLICING IN A WIRELESS COMMUNICATION NETWORK

(71) Applicant: T-MOBILE INNOVATIONS LLC, Overland Park, KS (US)

(72) Inventors: Sreekar Marupaduga, Overland Park, KS (US); Anurag Thantharate, Kansas City, MO (US); Sougata Saha, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/638,321

(22) Filed: Apr. 17, 2024

(65) Prior Publication Data
US 2024/0267789 A1    Aug. 8, 2024

Related U.S. Application Data

(63) Continuation of application No. 18/335,347, filed on Jun. 15, 2023, now Pat. No. 11,991,558, which is a continuation of application No. 17/372,695, filed on Jul. 12, 2021, now Pat. No. 11,722,928.

(51) Int. Cl.
*H04W 28/06* (2009.01)

(52) U.S. Cl.
CPC .................. *H04W 28/06* (2013.01)

(58) Field of Classification Search
CPC ........ H04W 28/06; H04W 36/13; H04W 8/22
See application file for complete search history.

(56) References Cited

U.S. PATENT DOCUMENTS

| | | | |
|---|---|---|---|
| 10,334,446 B2 | 6/2019 | Ashrafi | |
| 10,349,240 B2 | 7/2019 | Senarath et al. | |
| 10,505,870 B2 | 12/2019 | Cui et al. | |
| 10,673,751 B2 | 6/2020 | Dowlatkhah et al. | |
| 10,716,096 B2 | 7/2020 | Yu et al. | |
| 10,813,159 B2 | 10/2020 | Kim et al. | |
| 11,399,310 B1* | 7/2022 | Malhotra | H04W 28/06 |
| 2021/0112565 A1* | 4/2021 | Bhaskaran | H04W 8/18 |
| 2021/0273861 A1 | 9/2021 | Wang et al. | |
| 2021/0314811 A1 | 10/2021 | Barton et al. | |
| 2021/0345168 A1 | 11/2021 | Dhanapal et al. | |
| 2022/0014455 A1* | 1/2022 | Polehn | H04L 41/5009 |
| 2022/0039046 A1 | 2/2022 | Tanev et al. | |
| 2022/0053389 A1 | 2/2022 | Mu et al. | |
| 2022/0086846 A1* | 3/2022 | Sharma | H04W 72/543 |
| 2022/0086864 A1 | 3/2022 | Sabella et al. | |

(Continued)

*Primary Examiner* — Syed Ali

(57) ABSTRACT

A wireless communication system determines a first network slice and a second network slice to serve a user application. The wireless communication system identifies a performance level for the first network slice to serve the user application. The wireless communication system exchanges first user data using the first network slice to serve the user application. The wireless communication system determines actual performance of the first network slice to serve the user application. The wireless communication system compares the actual performance of the first network slice to the performance level for the first network slice, and in response, stops the exchange of the first user data to serve the user application using the first network slice and starts an exchange of second user data to serve the user application using the second network slice.

20 Claims, 8 Drawing Sheets

(56) References Cited

U.S. PATENT DOCUMENTS

| | | | |
|---|---|---|---|
| 2022/0104114 A1 | 3/2022 | Garcia Martin | |
| 2022/0132358 A1 | 4/2022 | Peng et al. | |
| 2022/0141095 A1 | 5/2022 | Beeram et al. | |
| 2022/0167422 A1 | 5/2022 | Hakola et al. | |
| 2022/0191737 A1 | 6/2022 | Mindler et al. | |
| 2022/0232579 A1* | 7/2022 | Lee | H04L 67/30 |
| 2022/0248301 A1 | 8/2022 | Ji et al. | |
| 2022/0264370 A1 | 8/2022 | Qiao et al. | |
| 2022/0271886 A1 | 8/2022 | He et al. | |
| 2022/0272567 A1* | 8/2022 | Polehn | H04W 28/0268 |
| 2022/0345996 A1 | 10/2022 | Jeong et al. | |
| 2022/0369204 A1 | 11/2022 | Jeong et al. | |
| 2022/0408300 A1* | 12/2022 | Bellamkonda | H04W 88/10 |
| 2023/0019215 A1 | 1/2023 | Wang et al. | |
| 2023/0254736 A1 | 8/2023 | Choi et al. | |
| 2023/0292173 A1 | 9/2023 | Zou et al. | |

* cited by examiner

NETWORK SLICING IN A WIRELESS COMMUNICATION NETWORK

RELATED CASES

This U.S. patent application is a continuation of U.S. patent application Ser. No. 18/335,347 that was filed on Jun. 15, 2023 and is entitled "NETWORK SLICING IN A WIRELESS COMMUNICATION NETWORK." U.S. patent application Ser. No. 18/335,347 is a continuation of U.S. Pat. No. 11,722,928 B1 that was filed on Jul. 12, 2021 and is entitled "NETWORK SLICING IN A WIRELESS COMMUNICATION NETWORK." U.S. patent application Ser. No. 18/335,347 and U.S. Pat. No. 11,722,928 B1 are hereby incorporated by reference into this U.S. patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores.

The network cores execute the network functions to provide wireless data services to the wireless user devices over the RANs. Exemplary network functions include Access and Mobility Management Functions (AMF), Session Management Functions (SMFs), and User Plane Functions (UPFs). The network functions are organized into a control plane and user plane. The control-plane control the network user-plane to serve the wireless user devices over wireless network slices. Each wireless network slice comprises a set of network functions that provide a wireless networking service. Different network slices provide different types of wireless networking services to the wireless user devices. Unfortunately, the wireless network cores do not efficiently serve wireless network slices to wireless user devices. Moreover, the wireless network cores do not effectively respond to network slices becoming overloaded.

TECHNICAL OVERVIEW

In some examples, a first network slice and a second network slice are determined to serve a user application. A performance level is identified for the first network slice to serve the user application. First user data is exchanged using the first network slice to serve the user application. Actual performance of the first network slice when serving the user application is determined. The actual performance of the first network slice is compared to the performance level for the first network slice, and in response, the exchange of the first user data to serve the user application using the first network slice is stopped and second user data is exchanged to serve the user application using the second network slice.

In some examples, a first network slice and a second network slice are identified to serve a user application. A performance level for the first network slice to serve the user application is determined. A first network address is determined for the first network slice to serve the user application and a second network address is determined for the second network slice to serve the user application. First user data is exchanged using the first network slice to serve the user application. The exchange of the first user data using the first network slice to serve the user application is stopped in response to a comparison of actual performance of the first network slice to the performance level for the first network slice. Second user data is exchanged using the second network slice to serve the user application in response to the comparison of the actual performance of the first network slice to the performance level for the first network slice.

In some examples, a wireless communication device comprises circuitry and a radio. The circuitry determines a first network slice and a second network slice to serve a user application. The circuitry identifies a performance level for the first network slice to serve the user application. The radio exchanges first user data using the first network slice to serve the user application. The circuitry determines actual performance of the first network slice to serve the user application. The circuitry compares the actual performance of the first network slice to the performance level for the first network slice, and in response, stops the exchange of the first user data over the radio to serve the user application using the first network slice and starts an exchange of second user data over the radio to serve the user application using the second network slice. The radio exchanges the second user data using the second network slice to serve the user application.

DETAILED DESCRIPTION

Figure 1:
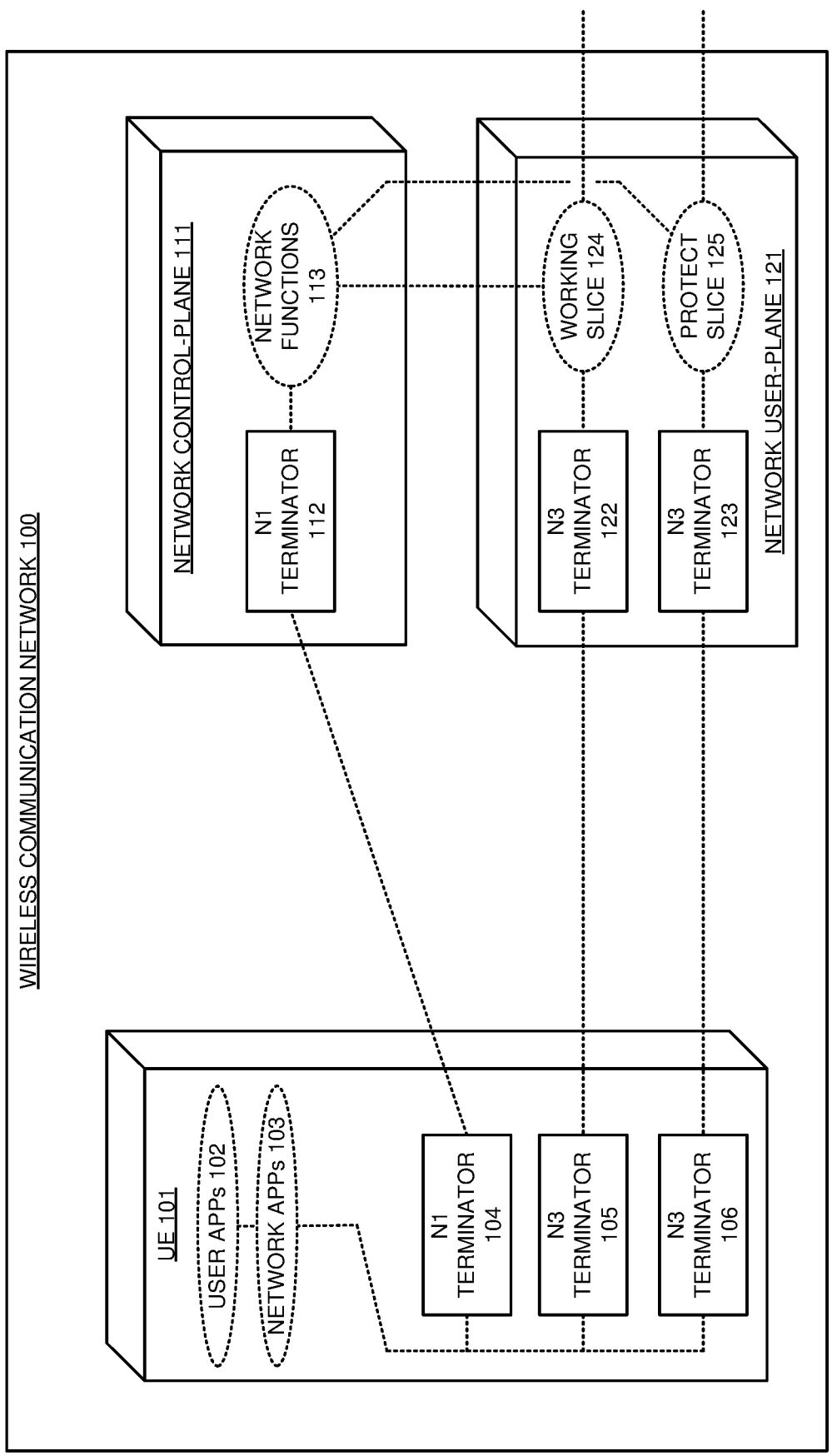
FIG. 1 illustrates a wireless communication network to serve a wireless User Equipment (UE) over a working network slice and a protect network slice.

FIG. 1 illustrates wireless communication network 100 to serve wireless User Equipment (UE) over working network slice 124 and protect network slice 125. Wireless communication network 100 delivers services to wireless user devices like internet-access, voice calling, media-streaming, machine communications, or some other wireless communications product. Wireless communication network 100 comprises wireless UE 101, network control-plane 111, and network user-plane 121. UE 101 comprises user applications (APPs) 102, networks applications 103, N1 terminator 104, and N3 terminators 105-106. Network control-plane 111 comprises N1 terminator 112 and network functions 113. Network user-plane 121 comprises N3 terminators 122-123, working network slice 124, and protect network slice 125. Working network slice 124 comprises a primary service slice for UE 101 and protect network slice 125 comprises a backup service slice for UE 101.

Various examples of network operation and configuration are described herein. In some examples, UE 101 transfers UE capability data to network control-plane 111. The UE capability data indicates working network slice 124 and protect network slice 125. Network control-plane 111 generates UE context for working network slice 124 and protect network slice 125. For example, the UE context may indicate an address pair for UE 101 and working network slice 124 and another address pair for UE 101 and protect network slice 125. Network control plane signals the UE context to UE 101 and to network user-plane 121. UE 101 exchanges user data with network user-plane 121 over working network slice 124 based on the UE context. Network user-plane 121 exchanges initial user data with UE 101 over working network slice 124 based on the UE context. UE 101 determines when the performance of the working network slice triggers a slice switch based on the UE context. For example, UE 101 may determine the latency of working network slice 124 is below a performance threshold indicated by the UE context. In response to the slice switch, UE 101 stops using working network slice 124. UE 101 exchanges user data with network user-plane 121 over protect network slice 125 based on the UE context. Network user-plane exchanges user data with UE 101 over protect network slice 125 based on the UE context. Advantageously, the user-plane 121 efficiently serves working network slice 124 and protect network slice 125 to UE 101. Moreover, UE 101 effectively responds to performance issues on working network slice 124 and maintains service continuity by triggering a slice switch to protect network slice 125.

Wireless UE 101 communicates over links that use wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. Network control-plane 111 and network user-plane 121 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

Wireless UE 101 comprises a computer, phone, vehicle, sensor, robot, or another type of data appliance with wireless communication circuitry. Wireless UE 101 communicates with network control-plane 111 and network user plane 121 over a Radio Access Network (RAN) that is omitted for clarity. The RAN comprises a Fifth Generation (5G) RAN, LTE RANs, gNodeB, eNodeB, NB-IoT access node, LP-WAN base station, wireless relay, WIFI hotspot, Bluetooth access node, and/or some other type of wireless network transceiver. UE 101 comprises antennas, amplifiers, filters, modulation, analog/digital interfaces, microprocessors, software, memories, transceivers, bus circuitry, and the like. Network control-plane 111 comprises network functions like Access and Mobility Management functions (AMFs), Session Management Functions (SMFs), Network Slice Selection Functions (NSSFs). Network user-plane 121 comprises network functions like User Plane Functions (UPFs). UE 101, network control-plane 111, and network user-plane 121 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
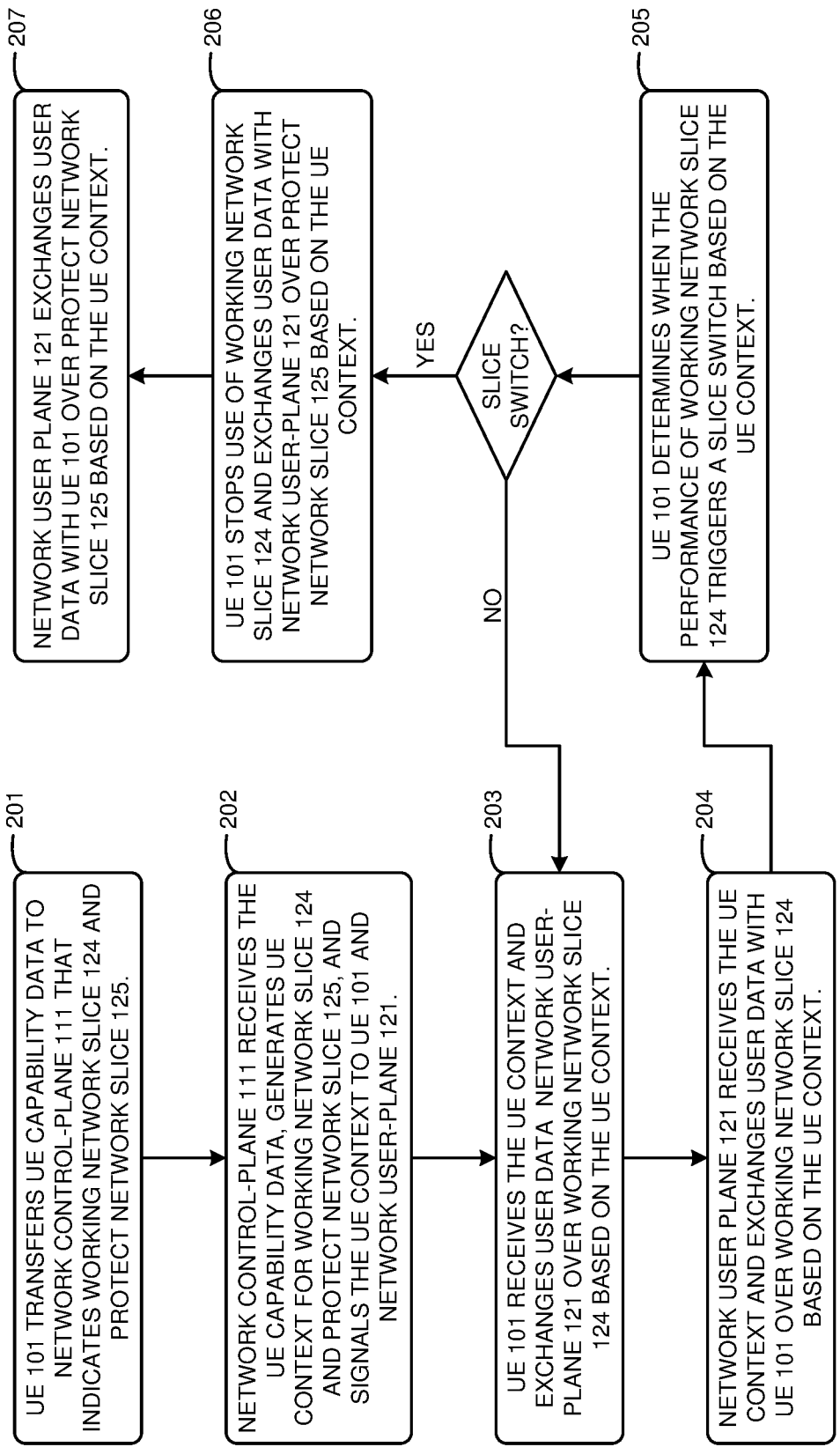
FIG. 2 illustrates an exemplary operation of the wireless communication network to serve a wireless UE over the working network slice and the protect network slice.

FIG. 2 illustrates an exemplary operation of wireless communication network 100 to serve wireless UE 101 over working network slice 124 and protect network slice 125. The operation may vary in other examples. UE 101 transfers UE capability data to network control-plane 111 that indicates working network slice 124 and protect network slice 125 (201). Network control-plane 111 receives the UE capability data, generates UE context for working network slice 124 and protect network slice 125, and signals the UE context to UE 101 and network user-plane 121 (202). UE 101 receives the UE context and exchanges user data with network user-plane 121 over working network slice 124 based on the UE context (203). Network user-plane 121 receives the UE context and exchanges user data with UE 101 over working network slice 124 based on the UE context (204). UE 101 determines when the performance of working network slice 124 triggers a slice switch based on the UE context (205). For example, the UE context may indicate a bit rate threshold and UE 101 may trigger the slice switch when the bit rate of working slice 124 falls below the threshold. When UE 101 does not trigger the slice switch, the operation returns to step 203. When UE 101 triggers the slice switch, UE 101 stops use of working network slice 124 and exchanges user data with network user-plane 121 over protect network slice 125 based on the UE context (206). Network user plane 121 exchanges user data with UE 101 over protect network slice 125 based on the UE context (207).

Figure 3:
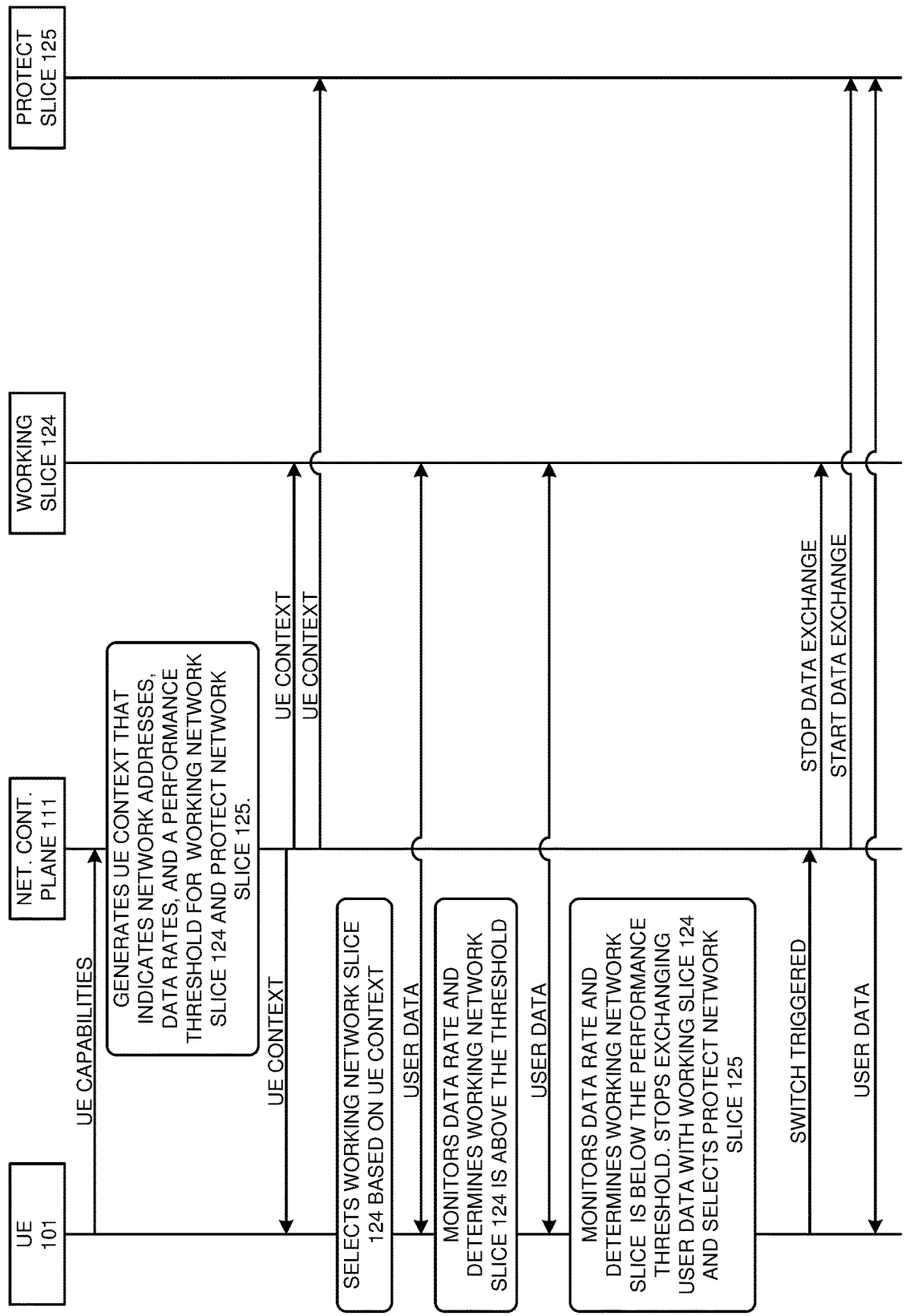
FIG. 3 illustrates another exemplary operation of the wireless communication network to serve a wireless UE over the working network slice and the protect network slice.

FIG. 3 illustrates an exemplary operation of wireless communication network 100 to serve wireless UE 101 over working network slice 124 and protect network slice 125. The operation may vary in other examples. UE 101 attaches to network control-plane 111 over a RAN. UE 101 wirelessly transfers UE capabilities for delivery to network control plane 111. The UE capabilities indicate working network slice 124 and protect network slice 125. For example, the UE capabilities may comprise Single Network Slice Selection Assistance Information (S-NSSAI) for working network slice 124 and protect network slice 125.

Network control-plane 111 receives the UE capabilities and responsively generates UE context for UE 101 and network user-plane 121. The UE context indicates network address pairs for UE 101 and slices 124-125, data rates for slices 124-125, and a performance threshold for working network slice 124. Typically, the downlink data rate for protect network slice 125 is less than the downlink data rate for working network slice 124. The performance threshold indicates a minimum acceptable performance for working network slice 124. For example, the performance threshold may comprise a bit rate, latency, throughput, or some other type of minimum performance indicator. The network address pairs correspond to N3 terminators 103-104 in UE 101 and N3 terminators 122-123 in network user-plane 121. For example, a N3 terminator 103 and N3 terminator 122 may comprise a network address pair for UE 101 and working network slice 124. Network control-plane 111 transfers the UE context to UE 101, working network slice 124, and protect network slice 125. Network control-plane 111 directs working network slice 124 and protect network slice 125 to serve UE 101.

UE 101 selects working network slice 124 based on the UE context. UE 101 exchanges user data with working network slice 124 using the network address pair for UE 101 and working network slice 124. UE 101 monitors the downlink data rate received from working network slice 124 and compares the downlink bit rate to the performance threshold. For example, UE 101 may determine an average downlink bit rate over a period of time and compare average downlink bit rate to the performance threshold. UE 101 determines the data rate for working network slice 124 is above the indicated performance threshold and in response, continues to exchange user data with working network slice 124.

Subsequently, UE 101 monitors the downlink data rate from working network slice 124 and compares the subsequent data rate to the performance threshold. UE 101 determines the downlink data rate for working network slice 124 is below the performance threshold. In response, UE 101 triggers a slice switch from working network slice 124 to protect network slice 125. UE 101 indicates the slice switch to network control-plane 111. Network control-plane 111 directs working network slice 124 to stop exchanging user data with UE 101 and directs protect network slice 125 to start exchanging user data with UE 101. UE 101 and working network slice 124 stop exchanging user data. UE selects protect network slice 125. UE 101 exchanges user data with protect network slice 125 using the address pair for UE 101 and protect network slice 125.

Figure 4:
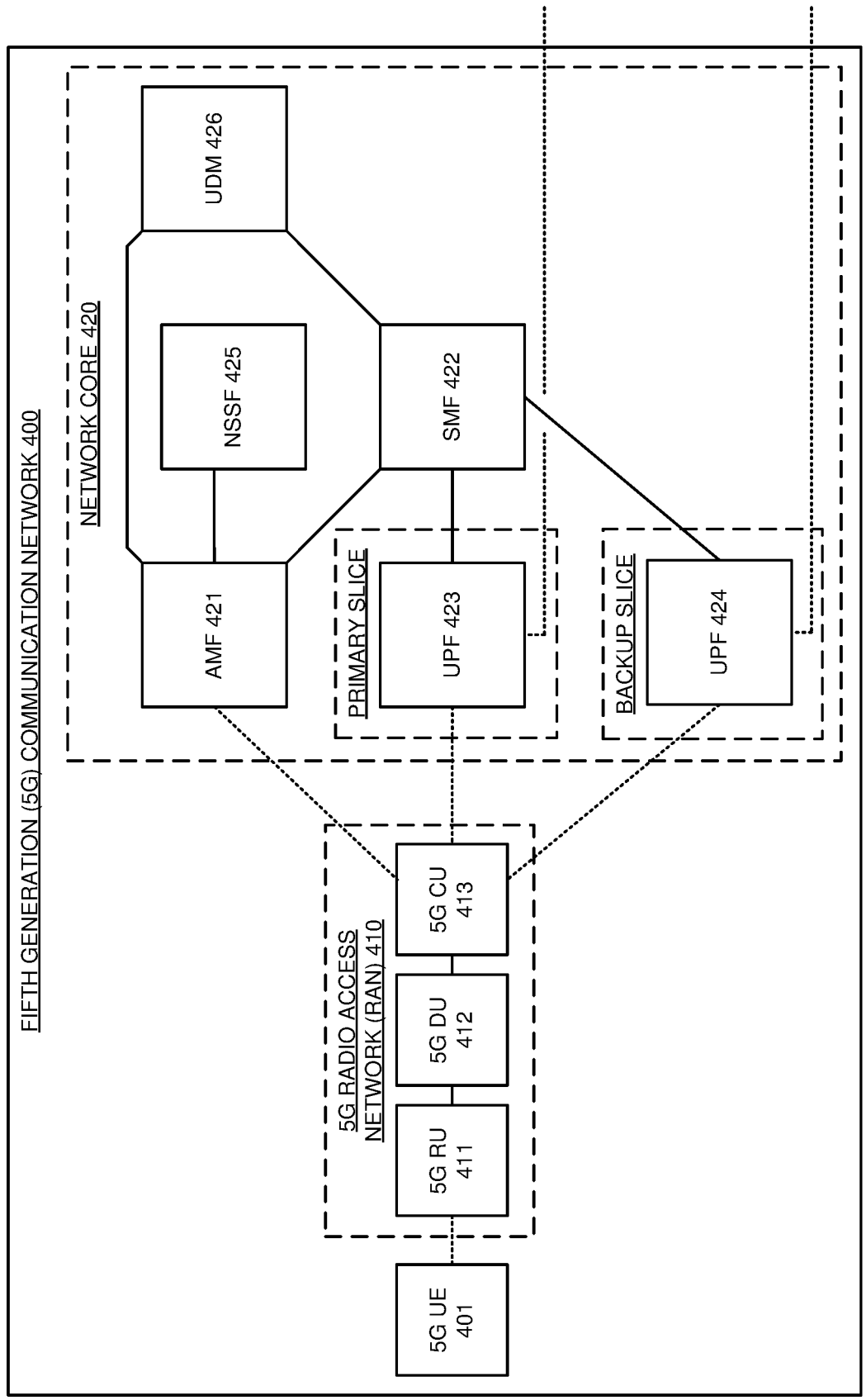
FIG. 4 illustrates a Fifth Generation (5G) communication network to serve a 5G UE over a primary network slice and a backup network slice.

FIG. 4 illustrates Fifth Generation (5G) communication network 400 to serve wireless UEs over a primary network slice and a backup network slice. 5G communication network 400 comprises an example of wireless communication network 100, although network 100 may differ. 5G communication network 400 comprises 5G UE 401, RAN 410, and 5G network core 420. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Functions (UPFs) 423-424, Network Slice Selection Function (NSSF) 425, and Uniform Data Management (UDM) 426. UPF 423 comprises a primary network slice and UPD 424 comprises a backup network slice. The primary slice comprises a requested service for UE 401. For example, the requested service may comprise an Ultra-Reliable Low Latency Communication (URLLC) service, a High-Definition (HD) streaming service, an augmented reality service, or some other type of wireless networking service. The backup slice comprises a lower-bandwidth minimum Guaranteed Bit Rate (GBR) service that UE 401 uses to maintain service continuity when the performance of the primary slice falls below a threshold. Other network functions, network elements, and regions are typically present in network core 420 but are omitted for clarity.

UE 401 wirelessly attaches to RU 411. UE 401 transfers attachment signaling that indicates Network Slice Selection Assistance Information (NSSAI) for a primary slice and a backup slice to CU 413 over RU 411 and DU 412. The NSSAI comprises slice Identifiers (IDs) for the primary slice and the backup slice. CU 413 establishes an RRC connection with UE 401. CU 413 transfers a registration request for UE 401 to AMF 421. The registration request indicates NSSAI for the requested slices. AMF 421 interacts with other network functions to authenticate UE 401 for wireless data services. For example, AMF 421 may interact with an Authenticating Server Function (AUSF) to authenticate UE 401. In response to the authentication, AMF 421 queries UDM 426 for subscriber information for UE 401. UDM 426 returns subscriber information for UE 401 to AMF 421. The subscriber information comprises authorized service attributes for UE 401 like Data Network Names (DNNs), Quality-of-Service (QoS) values, Protocol Data Unit (PDU) session types, S-NSSAIs, and the like. AMF 421 identifies that UE 401 is authorized for the primary slice and the backup slice based on the authorized service attributes.

In response to the authentication and authorization, AMF 421 requests data rates for the primary slice and the backup slice and a performance threshold the primary slice from NSSF 425. NSSF 425 selects data rates for the slices and generates a performance threshold for the primary slice. The data rate for the primary slice is typically higher than the data rate for the backup slice. The performance threshold indicates a minimum acceptable performance for the primary slice. The performance threshold may comprise a downlink data rate, a latency, and/or some other type of performance indicator. NSSF 425 transfers the data rates and performance threshold to AMF 421. AMF 421 directs SMF 422 to serve UE 401 over the primary slice and the backup slice. SMF 422 selects UPF 423 and UPF 424 to serve UE 401 based on the requested slice types. SMF 422 directs the UPF 423 to establish a PDU session with UE 401 and UPF 424 to establish a backup data link with UE 401. SMF 422 indicates the network addresses for UPFs 423-424 to AMF 421. AMF 421 generates UE context that indicates the performance threshold for the primary slice, data rates for the primary slice and the backup slice, and network addresses for UPFs 423-424. AMF 421 transfers the UE context to UE 401 over RAN 410. UE 401 establishes a primary data link with UPF 423 over RAN 410 based on the network address pair for UPF 423 and UE 401. UE 401 establishes a backup data link with UPF 424 over RAN 410 based on the network address pair for UPF 424 and UE 401. UE 401 initiates a PDU session with UPF 423 and wirelessly exchanges user data with UPF 423 over the primary data link and RAN 410. The PDU session may comprise URLLC data session, an augmented reality data session, a HD video conferencing data session, and/or some other type of PDU session. UE 401 monitors the performance of UPF 423 in the primary slice based on the performance threshold indicated in the UE context. In some examples, UE 401 determines the average downlink data rate to monitor the performance of UPF 423. In some examples, UE 401 determines the average downlink data latency for UPF 423. Typically, the performance attribute that UE 401 monitors is based on the type of PDU session provided by UPF 423. For example, if UE 401 has a URLLC PDU session with UPF 423 in the primary slice, UE 401 may determine average downlink data latency to monitor performance.

UE 401 determines when the performance of UPF 423 is below the performance threshold indicated in the UE context. When the performance of UPF 423 falls below the performance threshold, UE 401 triggers a slice switch from the primary slice to the backup slice. UE 401 stops exchanging data UPF 423 over the primary data link and indicates the slice switch to AMF 421 over RAN 410. AMF 421 forwards the slice switch to SMF 422. SMF 422 directs UPF 423 to stop exchanging data with UE 401 over the primary data link. SMF 422 directs UPF 424 to serve UE 401 a minimum GBR service to UE 401 over the backup data link. UE 401 continues the PDU session with UPF 424 and wirelessly exchanges user data with UPF 424 over the backup data link and RAN 410.

In some examples, AMF 421 determines when the performance of the primary slice falls below the performance threshold as described for UE 401. AMF 421 may receive UE reports from UE 401 that indicate the performance of UPF 423 in the primary slice. When the performance of UPF 423 falls below the performance threshold, AMF 421 directs UE 401 to switch from the primary slice to the backup slice and directs SMF 422 to implement the slice switch. SMF 422 directs UPF 424 to serve UE 401 over the backup data link and directs UPF 423 to stop exchanging data with UE 401 over the primary data link. UE 401 switches slices per the direction of AMF 421 and exchanges user data with UPF 424 over the backup data link.

Figure 5:
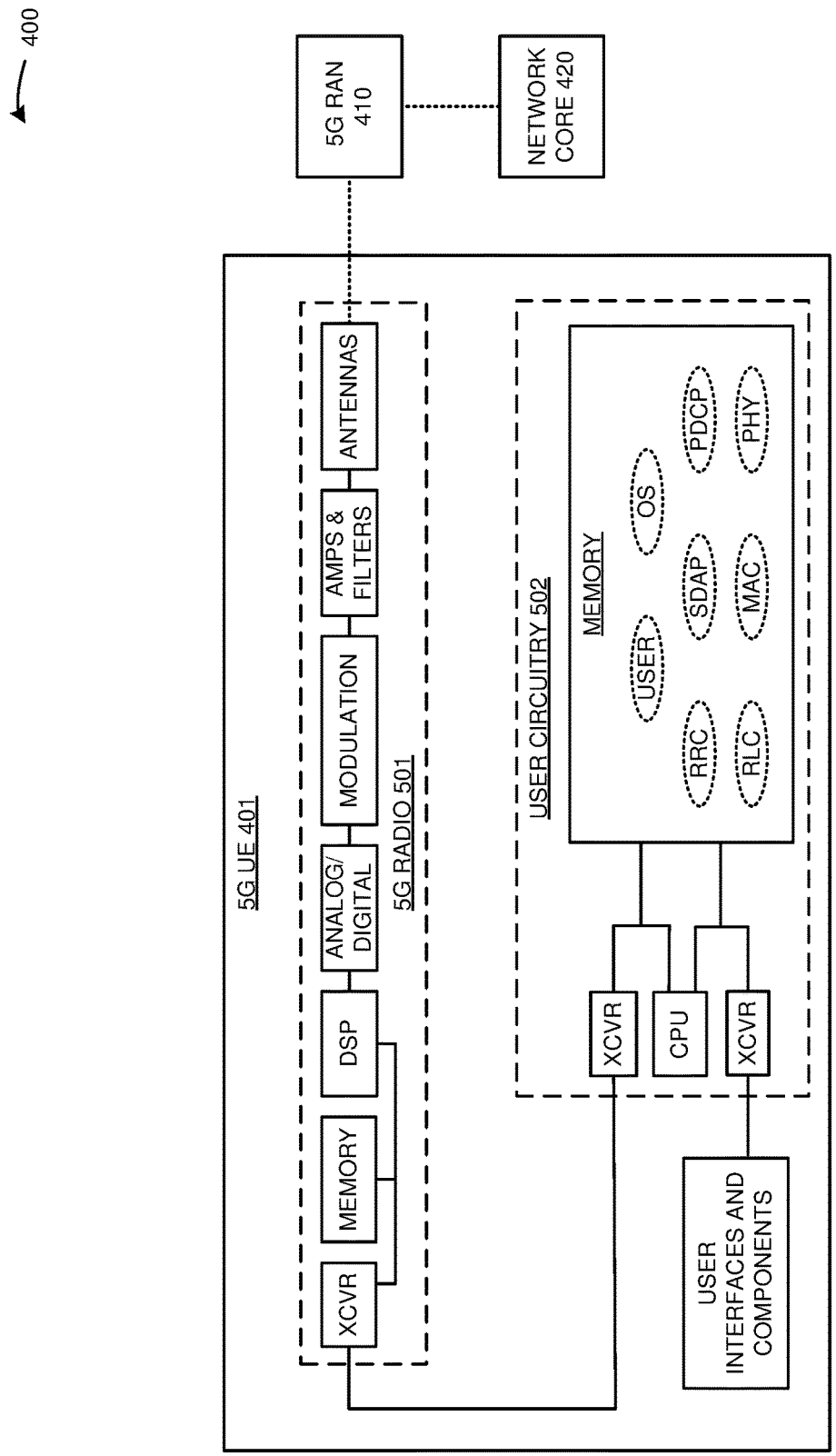
FIG. 5 illustrates the 5G UE in the 5G communication network.

FIG. 5 illustrates 5G UE 401 in 5G communication network 400. UE 401 comprises an example of the wireless UE 101, although UE 101 may differ. UE 401 comprises 5G radio 501 and user circuitry 502. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The antenna in radio 501 is wirelessly coupled to 5G RAN 410 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
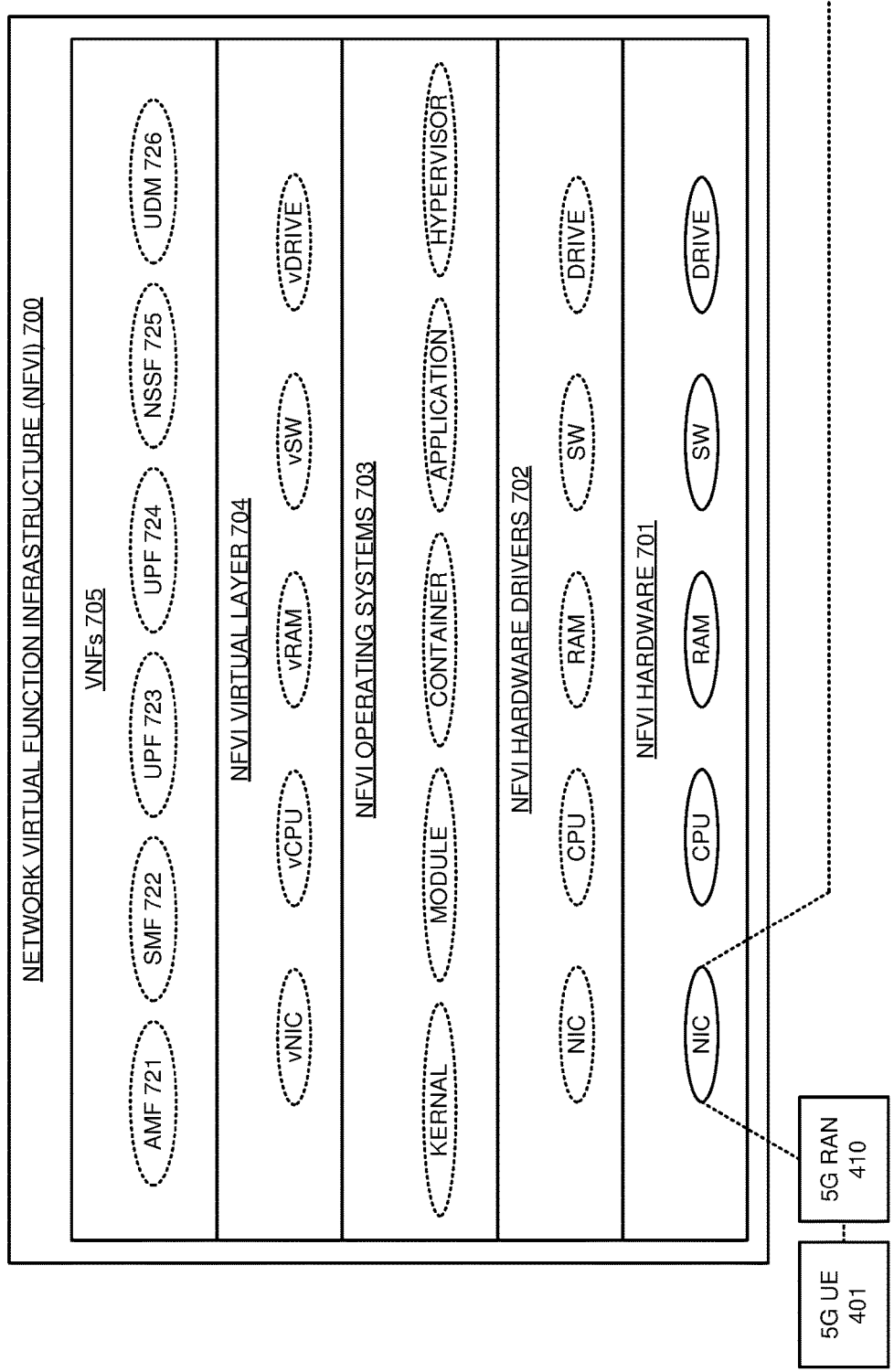
FIG. 6 illustrates a Network Function Virtualization Infrastructure (NFVI) in the 5G communication network.

FIG. 6 illustrates Network Function Virtualization Infrastructure (NFVI) 600 in 5G communications network 400. NFVI 600 comprises an example of network controller 121, UDM 131, and network data system 141, although network controller 121, UDM 131, and network data system 141 may vary from this example. NFVI 600 comprises NFVI hardware 601, NFVI hardware drivers 602, NFVI operating systems 603, NFVI virtual layer 604, and NFVI Virtual Network Functions (VNFs) 605. NFVI hardware 601 comprises Network Interface Cards (NICs), CPU, RAM, Flash/Disk Drives (DRIVE), and Data Switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises vNIC, vCPU, vRAM, vDRIVE, and vSW. NFVI VNFs 605 comprise AMF 621, SMF 622, UPFs 623-624, NSSF 625, and UDM 726. Additional VNFs and network elements like Authenticating Server Function (AUSF), Policy Control Function (PCF), and Network Exposure Function (NEF) are typically present but are omitted for clarity. NFVI 600 may be located at a single site or be distributed across multiple geographic locations. The NIC in NFVI hardware 601 is coupled to 5G RAN 410 and to external systems. NFVI hardware 601 executes NFVI hardware drivers 602, NFVI operating systems 603, NFVI virtual layer 604, and NFVI VNFs 605 to form AMF 421, SMF 422, UPFs 423-424, NSSF 425, and UDM 426.

Figure 7:
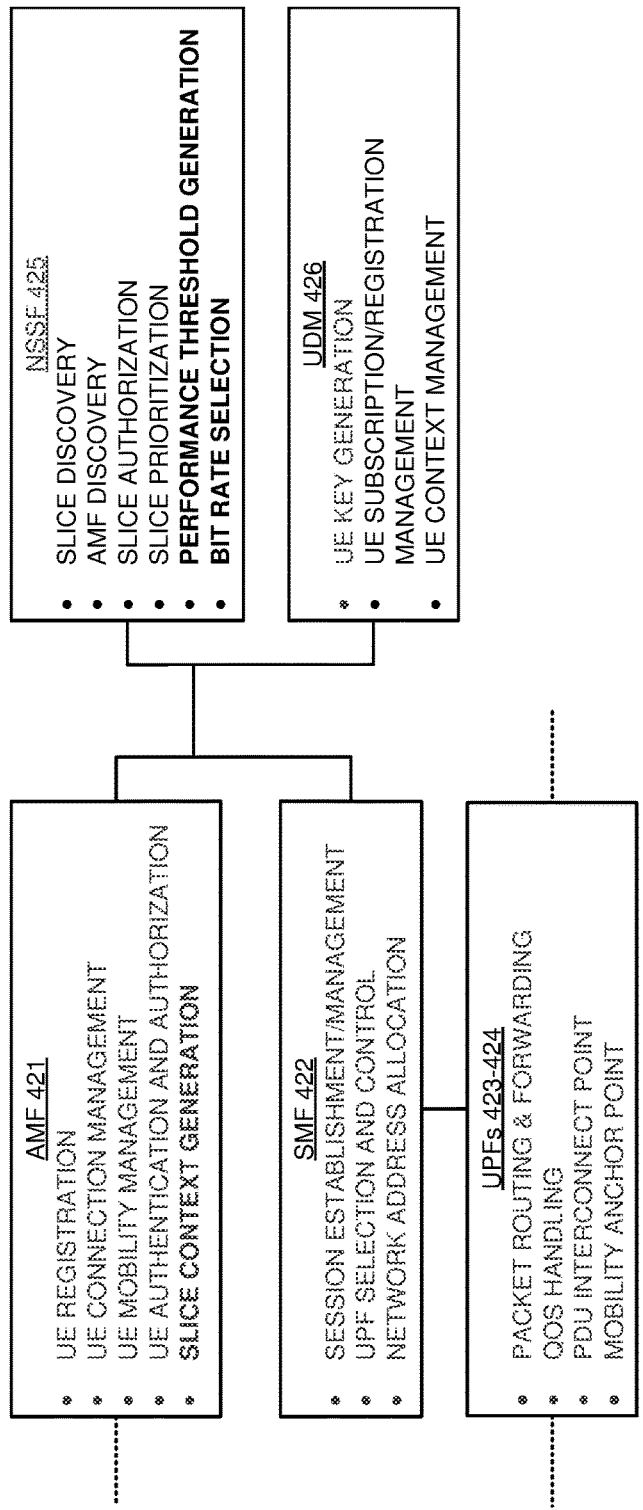
FIG. 7 further illustrates the NFVI in the 5G communication network.

FIG. 7 further illustrates NFVI 600 in 5G communication network 400. AMF 421 performs UE registration and connection, UE connection/mobility management, UE authentication and authorization, and slice context generation. SMF 422 performs session establishment and management, UPF selection and control, and network address allocation. UPFs 423-434 perform packet routing & forwarding, QoS handling, PDU interconnection, and mobility anchoring. NSSF 425 performs slice discovery, AMF discovery, slice authorization, slice prioritization, performance threshold generation, and bit rate selection. UDM 426 performs UE key generation, UE subscription and registration management, UE subscription identification, and UE subscription overrides and enforcement.

In this example, UE 401 triggers a slice switch from an augmented reality primary slice to an audio only augmented reality backup slice, however the operation may differ in other examples. UE 401 wirelessly attaches to AMF 421 over RAN 410. AMF 421 receives attachment signaling that indicates NSSAI for an augmented reality slice and audio only augmented reality slice from UE 401. AMF 421 interacts with other network functions and authenticates UE 401. In response to the authentication, AMF 421 retrieves subscriber information for UE 401 from UDM 426. UDM 426 returns service attributes for UE 401 that indicate authorized DNNs, QoS values, PDU session types, augmented reality NSSAI, and backup NSSAI.

In response to the authentication and authorization, AMF 421 transfers slice IDs for the augmented reality slice and backup slice to NSSF 425. NSSF 425 selects a data rate for the augmented reality slice and a lower data rate for the audio only backup slice. NSSF 425 generates a performance threshold for the augmented reality slice. The performance threshold indicates a minimum downlink data rate and a minimum latency for the augmented reality slice. NSSF 425 transfers the data rates and performance threshold to AMF 421. AMF 421 directs SMF 422 to serve UE 401 over the augmented reality slice and the audio only backup slice. SMF 422 selects UPF 423 for the augmented reality slice and selects UPF 424 for the audio only backup slice. SMF 422 directs the UPF 423 to establish an augmented reality PDU session with UE 401 and directs UPF 424 to establish a backup data link with UE 401. SMF 422 transfers the network addresses for UPFs 423-424 to AMF 421. AMF 421 generates UE context that indicates the performance threshold, the data rates for the primary slice and the backup slice, and network address pairs between UE 401 and UPFs 423-424. AMF 421 transfers the UE context to UE 401 over RAN 410.

UE 401 establishes a primary data link for the augmented reality service with UPF 423 using the network address pair for UPF 423 and UE 401. UE 401 establishes a backup data link for the audio only service with UPF 424 over RAN 410 using the network address pair for UPF 424 and UE 401. UE 401 begins the augmented reality PDU session with UPF 423. UE 401 and UPF 423 exchange user data for the augmented reality PDU session over the primary data link and RAN 410. UE 401 monitors the downlink latency and downlink bitrate of the primary data link from UPF 423.

UE 401 determines when the downlink latency or the downlink bitrate for the augmented reality PDU session falls below the performance threshold. When either the downlink latency or the downlink bitrate falls below the performance threshold, UE 401 triggers a slice switch from the augmented reality slice to the audio only slice. The slice switch reduces the bandwidth of the data service for UE 401 while maintaining service continuity. UE 401 stops exchanging data UPF 423 over the primary data link. UE 401 indicates the slice switch to AMF 421 and AMF 421 forwards the slice switch to SMF 422. SMF 422 directs UPF 423 to stop exchanging data with UE 401 over the primary data link. SMF 422 directs UPF 424 to serve UE 401 an audio only service to UE 401 over the backup data link. UE 401 continues the PDU session with UPF 424 and wirelessly exchanges user data with UPF 424 over the backup data link and RAN 410.

Figure 8:
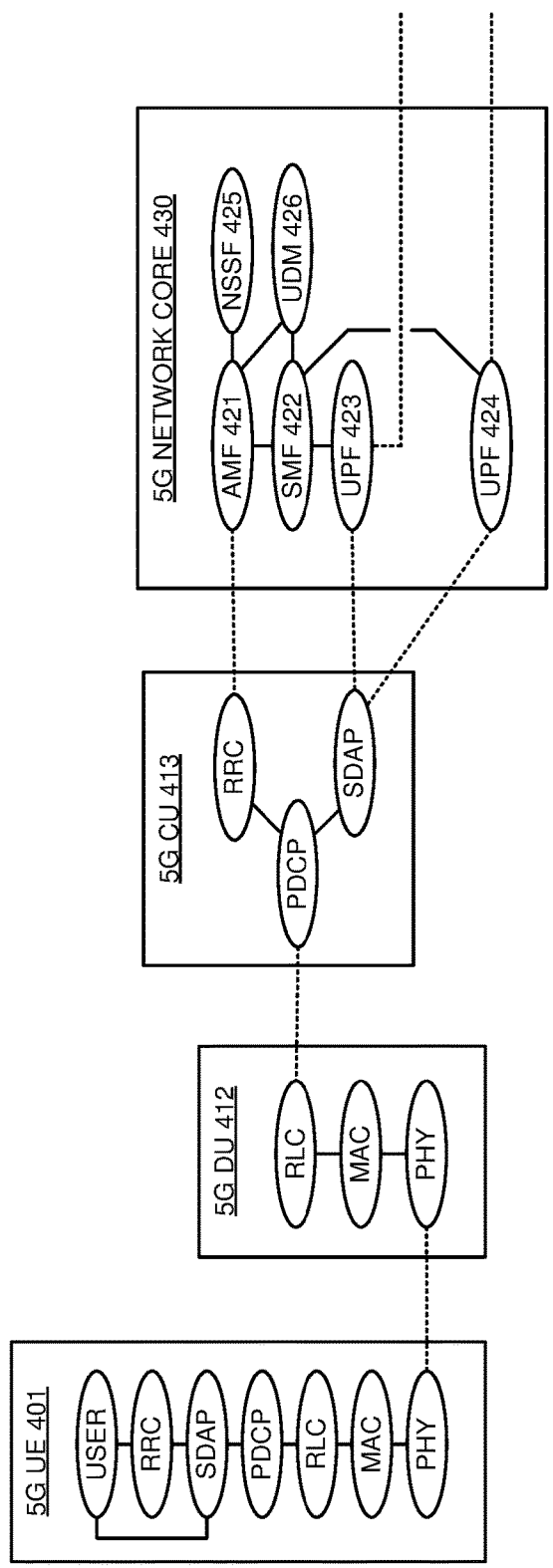
FIG. 8 illustrates an exemplary operation of the 5G communication network to serve the 5G UE over a URLLC network slice and minimum GBR network slice.

FIG. 8 illustrates an exemplary operation of the 5G communication network to serve wireless UEs over a primary network slice and a backup network slice. The operation may vary in other examples. In this example, UE 401 triggers a slice switch from an URLLC slice to a minimum GBR backup slice, however the operation may differ in other examples.

The RRC in UE 401 transfers attachment signaling that indicates NSSAI for an URLLC slice and minimum GBR slice from UE 401 to the RRC in CU 413 over the PDCPs, RLCs, MACs, and PHYs. AMF 421 interacts with other network functions and responsively authenticates UE 401. In response to the authentication, AMF 421 requests subscriber information for UE 401 from UDM 426. UDM 426 indicates authorized services for UE 401 that comprise DNNs, QoS values, PDU session types, a URLLC NSSAI, and a minimum GBR NSSAI.

In response to the authentication and authorization, AMF 421 transfers the slice IDs for the URLLC slice and minimum GBR slice to NSSF 425. NSSF 425 selects a data rate for the URLLC slice and a lower data rate for the minimum GBR slice. NSSF 425 generates a performance threshold for the URLLC slice that indicates a minimum latency for the URLLC slice. NSSF 425 transfers the data rates and performance threshold to AMF 421. AMF 421 directs SMF 422 to serve UE 401 over the URLLC slice and the minimum GBR slice. SMF 422 controls the operation of UPF 423 for the URLLC slice and selects UPF 424 for the minimum GBR slice. SMF 422 directs the UPF 423 to establish an URLLC PDU session with UE 401 and directs UPF 424 to establish a backup data link with UE 401. SMF 422 transfers the network addresses for UPFs 423-424 to AMF 421. AMF 421 generates UE context that indicates the performance threshold, the data rates for the primary slice and the backup slice, and network address pairs between UE 401 and UPFs 423-424. AMF 421 transfers the UE context to the RRC in CU 413. The RRC in CU 413 forwards to the UE context to the RRC in UE 401 over the PDCPs, RLCs, MACs, and PHYs.

The RRC in UE 401 directs the SDAP in UE 401 to establish data links for the URLLC slice and the backup minimum GBR slice. The SDAP uses the network address pair for UPF 423 and UE 401 and establishes a primary data link for the URLLC slice with UPF 423 over the PDCPs, RLCs, MACs, PHYs, and SDAP in CU 413. The SDAP uses the network address pair for UPF 424 and UE 401 and establishes a secondary data link for the minimum GBR slice with UPF 424 over the PDCPs, RLCs, MACs, PHYs, and SDAP in CU 413. The SDAP notifies the RRC in UE 401 and UE 401 associates the primary data link with the URLLC slice and the secondary data link with the minimum GBR slice. The SDAP in UE 401 begins the URLLC PDU session with UPF 423. The SDAP in UE 401 exchanges user data for the URLLC PDU session over the primary data link with the SDAP in CU 413 over the PDCPs, RLCs, MACs, and PHYs. The SDAP in CU 413 exchanges the user data with UPF 423 over the primary data link. The SDAP in UE 401 monitors the downlink latency of the primary data link from UPF 423.

The SDAP in UE 401 determines when the downlink latency for the URLLC PDU session falls below the latency indicated by performance threshold. When the downlink latency falls below the performance threshold, the SDAP UE 401 notifies the RRC in UE 401 to trigger a slice switch from the URLLC slice to the minimum GBR slice. The SDAP in UE 401 stops exchanging data with the SDAP in CU 413 over the PDCPs, RLCs, MACs, and PHYs. The SDAP in CU 413 stops exchanging data with UPF 423 over the primary data link. The RRC in UE 401 indicates the slice switch to the RRC in CU 413 over the PDCPs, RLCs, MACs, and PHYs. The RRC in CU 413 forwards the indication to AMF 421 and AMF 421 notifies SMF 422. SMF 422 directs UPF 423 to stop exchanging data with UE 401 over the primary data link. SMF 422 directs UPF 424 to serve UE 401 the minimum GBR service to UE 401 over the backup data link. The SDAP in UE 401 continues the PDU session with UPF 424. The SDAP exchanges user data with the SDAP in CU 413 over the PDCPs, RLC, MACs, and PHYs. The SDAP in CU 413 exchanges user data with UPF 424 over the backup data link.

The wireless data network circuitry described above comprises computer hardware and software that form special-purpose network circuitry to serve a wireless UE over a working network slice and a protect network slice. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve the wireless UE over a working network slice and a protect network slice.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method comprising:
    determining a first network slice and a second network slice of a communication network to serve a user application;
    identifying a performance level for the first network slice to serve the user application, wherein identifying the performance level comprises identifying a data latency level;
    exchanging first user data using the first network slice to serve the user application based on User Equipment (UE) context received from the communication network;
    determining actual performance of the first network slice when serving the user application, wherein determining the actual performance comprises determining an actual data latency level; and
    comparing the actual performance of the first network slice to the performance level for the first network slice, and in response, stopping the exchange of the first user data to serve the user application using the first network slice and exchanging second user data to serve the user application using the second network slice, wherein comparing the actual performance of the first network slice to the performance level for the first network slice comprises comparing the actual data latency level to the data latency level.

2. The method of claim 1 wherein:
    identifying the performance level for the first network slice comprises identifying a data throughput level;
    determining the actual performance of the first network slice comprises determining actual data throughput; and
    comparing the actual performance of the first network slice to the performance level for the first network slice comprises comparing the actual data throughput to the data throughput level.

3. The method of claim 1 wherein:
    identifying the performance level for the first network slice comprises identifying a downlink parameter;
    determining the actual performance of the first network slice comprises determining downlink performance; and
    comparing the actual performance of the first network slice to the performance level for the first network slice comprises comparing the downlink performance to the downlink parameter.

4. The method of claim 1 further comprising identifying a network address for the second network slice to serve the user application before exchanging the first user data using the first network slice to serve the user application.

5. The method of claim 1 further comprising establishing a data link for the second network slice to serve the user application before exchanging the first user data using the first network slice to serve the user application.

6. The method of claim 1 wherein:
determining the first network slice and the second network slice comprises a wireless communication device determining the first network slice and the second network slice;
identifying the performance level for the first network slice comprises the wireless communication device receiving signaling that indicates the performance level for the first network slice from a wireless communication network;
exchanging first user data using the first network slice comprises the wireless communication device exchanging the first user data using the first network slice;
determining the actual performance of the first network slice comprises the wireless communication device determining the actual performance of the first network slice; and
comparing the actual performance of the first network slice to the performance level for the first network slice, and in response, stopping the exchange of the first user data using the first network slice and exchanging second user data using the second network slice comprises the wireless communication device comparing the actual performance of the first network slice to the performance level for the first network slice, and in response, the wireless communication device stopping the exchange of the first user data using the first network slice and the wireless communication device exchanging the second user data using the second network slice.

7. The method of claim 1 wherein the first user data and the second user data comprise one or more of Ultra-Reliable Low Latency Communications (URLLC) session data, Augmented Reality (AR) session data, or High Definition (HD) video conferencing data.

8. A method comprising:
identifying a first network slice and a second network slice to serve a user application;
determining a performance level for the first network slice to serve the user application, wherein determining the performance level for the first network slice comprises determining a data latency level;
determining a first network address for the first network slice to serve the user application and determining a second network address for the second network slice to serve the user application;
exchanging first user data using the first network slice to serve the user application based on User Equipment (UE) context for a UE executing the user application;
stopping the exchange of the first user data using the first network slice to serve the user application in response to a comparison of actual performance of the first network slice to the performance level for the first network slice, wherein the comparison of the actual performance of the first network slice to the performance level for the first network slice comprises a comparison of actual data latency to the data latency level; and
exchanging second user data using the second network slice to serve the user application in response to the comparison of the actual performance of the first network slice to the performance level for the first network slice.

9. The method of claim 8 wherein:
identifying the performance level for the first network slice comprises identifying a data throughput level; and
the comparison of the actual performance of the first network slice to the performance level for the first network slice comprises a comparison of actual data throughput to the data throughput level.

10. The method of claim 8 wherein:
identifying the performance level for the first network slice comprises identifying a downlink parameter; and
the comparison of the actual performance of the first network slice to the performance level for the first network slice comprises a comparison of downlink performance to the downlink parameter.

11. The method of claim 8 wherein determining the second network address for the second network slice to serve the user application comprises determining the second network address for the second network slice to serve the user application before exchanging the first user data using the first network slice to serve the user application.

12. The method of claim 8 further comprising establishing a data link for the second network slice to serve the user application before exchanging the first user data using the first network slice to serve the user application.

13. The method of claim 8 wherein:
identifying the first network slice and the second network slice comprises a network control-plane receiving signaling from a wireless communication device that indicates the first network slice and the second network slice;
determining the performance level for the first network slice comprises the network control-plane determining the performance level for the first network slice;
determining the first network address for the first network slice and determining the second network address for the second network slice comprises the network control-plane determining the first network address for the first network slice and determining the second network address for the second network slice;
exchanging first user data using the first network slice comprises a network user-plane exchanging the first user data using the first network slice;
stopping the exchange of the first user data using the first network slice in response to the comparison of the actual performance of the first network slice to the performance level for the first network slice comprises the network user-plane stopping the exchange of the first user data using the first network slice in response to the comparison of the actual performance of the first network slice to the performance level for the first network slice; and
exchanging the second user data using the second network slice in response to the comparison of the actual performance of the first network slice to the performance level for the first network slice comprises the network user-plane exchanging the second user data using the second network slice in response to the comparison of the actual performance of the first network slice to the performance level for the first network slice.

14. The method of claim 8 wherein the first user data and the second user data comprise one or more of Ultra-Reliable Low Latency Communications (URLLC) session data, Augmented Reality (AR) session data, or High Definition (HD) video conferencing data.

15. A wireless communication device comprising:
circuitry configured to determine a first network slice and a second network slice of the wireless communication network to serve a user application;
the circuitry further configured to identify a performance level for the first network slice to serve the user application, wherein the performance level for the first network slice comprises a data latency level;
a radio configured to exchange first user data using the first network slice to serve the user application based on User Equipment (UE) context received from the wireless communication network;
the circuitry further configured to determine actual performance of the first network slice to serve the user application, wherein the actual performance of the first network slice comprises actual data latency;
the circuitry further configured to compare the actual performance of the first network slice to the performance level for the first network slice, and in response, to stop the exchange of the first user data over the radio to serve the user application using the first network slice and to start an exchange of second user data over the radio to serve the user application using the second network slice; and
the radio further configured to exchange the second user data using the second network slice to serve the user application.

16. The wireless communication device of claim 15 wherein:
the performance level for the first network slice comprises a data throughput level; and
the actual performance of the first network slice comprises actual data throughput.

17. The wireless communication device of claim 15 wherein:
the performance level for the first network slice comprises a downlink parameter; and
the actual performance of the first network slice comprises downlink performance.

18. The wireless communication device of claim 15 wherein the circuitry is further configured to identify a network address for the second network slice to serve the user application before the radio exchanges the first user data using the first network slice to serve the user application.

19. The wireless communication device of claim 15 wherein the circuitry is further configured to establish a data link for the second network slice to serve the user application before the radio exchanges the first user data using the first network slice to serve the user application.

20. The wireless communication network of claim 15 wherein the first user data and the second user data comprise one or more of Ultra-Reliable Low Latency Communications (URLLC) session data, Augmented Reality (AR) session data, or High Definition (HD) video conferencing data.

* * * * *